(12) United States Patent
Kato et al.

(10) Patent No.: US 7,799,157 B2
(45) Date of Patent: Sep. 21, 2010

(54) PRESSURE-SENSITIVE ADHESIVE SHEET AND METHOD OF MANUFACTURING THE SAME

(75) Inventors: Kiichiro Kato, Warabi (JP); Kazuhiro Tsuda, Warabi (JP); Osamu Kanazawa, Warabi (JP)

(73) Assignee: Lintec Corporation, Tokyo (JP)

( * ) Notice: Subject to any disclaimer, the term of this patent is extended or adjusted under 35 U.S.C. 154(b) by 896 days.

(21) Appl. No.: 10/592,014

(22) PCT Filed: Feb. 24, 2005

(86) PCT No.: PCT/JP2005/003021

§ 371 (c)(1),
(2), (4) Date: Feb. 8, 2007

(87) PCT Pub. No.: WO2005/085382

PCT Pub. Date: Sep. 15, 2005

(65) Prior Publication Data

US 2008/0193695 A1 Aug. 14, 2008

(30) Foreign Application Priority Data

Mar. 8, 2004 (JP) .............................. 2004-064663

(51) Int. Cl.
*B32B 37/14* (2006.01)
(52) U.S. Cl. .................. 156/87; 156/252; 156/253; 156/257; 427/208.6; 427/348
(58) Field of Classification Search .................. 156/87, 156/252, 253, 257, 268; 427/208.6, 348
See application file for complete search history.

(56) References Cited

U.S. PATENT DOCUMENTS 4,350,545 A * 9/1982 Garabedian .................. 156/87

(Continued)

FOREIGN PATENT DOCUMENTS

JP 4-100235 8/1992

(Continued)

OTHER PUBLICATIONS

Translation of JP 07-164873, Jun. 1995.*

(Continued)

*Primary Examiner*—Jeff H Aftergut
*Assistant Examiner*—David Simmons
(74) *Attorney, Agent, or Firm*—Posz Law Group, PLC

(57) ABSTRACT

A pressure-sensitive adhesive layer 3 is formed on a release treated surface of a release liner 4, and gas from holes 40 in the release liner 4 is made to move to the outside of the pressure-sensitive adhesive layer 3, thus forming through holes 31 in the pressure-sensitive adhesive layer 3. The pressure-sensitive adhesive layer 3 and a base material 2 having provided therein gas-passing channels that communicate to the outside of the pressure-sensitive adhesive sheet are then laminated together such that the gas-passing channels in the base material 2 and the through holes 31 in the pressure-sensitive adhesive layer 3 communicate with one another, thus obtaining a pressure-sensitive adhesive sheet 1. According to the pressure-sensitive adhesive sheet 1, air entrapment and blistering can be prevented or eliminated while securing adequate adhesive strength and with no marring of the appearance.

4 Claims, 6 Drawing Sheets

U.S. PATENT DOCUMENTS

| | | | |
|---|---|---|---|
| 4,472,461 A * | 9/1984 | Johnson | 427/208.6 |
| 5,098,500 A * | 3/1992 | Reed et al. | 156/253 |
| 5,127,974 A * | 7/1992 | Tomiyama et al. | 156/85 |
| 5,858,155 A * | 1/1999 | Hill et al. | 156/230 |
| 6,254,711 B1 * | 7/2001 | Bull et al. | 156/234 |
| 7,001,475 B2 * | 2/2006 | Ausen et al. | 156/229 |
| 7,018,501 B1 * | 3/2006 | Nelson | 156/253 |
| 2003/0211285 A1 * | 11/2003 | Abe | 428/138 |
| 2008/0121337 A1 * | 5/2008 | Schuster et al. | 156/87 |

FOREIGN PATENT DOCUMENTS

| | | |
|---|---|---|
| JP | 3002567 | 7/1994 |
| JP | 07-164873 | 6/1995 |
| JP | 07164873 * | 6/1995 |
| JP | 2503717 | 4/1996 |
| JP | 2587198 | 10/1998 |
| JP | 2005-075953 | 3/2005 |
| JP | 2005-075966 | 3/2005 |

OTHER PUBLICATIONS

International Search Report for corresponding International application No. PCT/JP2005/003021.

* cited by examiner

PRESSURE-SENSITIVE ADHESIVE SHEET AND METHOD OF MANUFACTURING THE SAME

TECHNICAL FIELD

The present invention relates to a pressure-sensitive adhesive sheet according to which air entrapment and blistering can be prevented or eliminated, and a method of manufacturing such a pressure-sensitive adhesive sheet.

BACKGROUND ART

When sticking a pressure-sensitive adhesive sheet onto an adherend by hand, entrapment of air between the adherend and the pressure-sensitive adhesive surface may occur, marring the appearance of the pressure-sensitive adhesive sheet. Such air entrapment is particularly prone to occur in the case that the pressure-sensitive adhesive sheet has a large area.

To eliminate problems with appearance of a pressure-sensitive adhesive sheet due to air entrapment, another pressure-sensitive adhesive sheet may be stuck on in place of the original pressure-sensitive adhesive sheet, or the original pressure-sensitive adhesive sheet may be peeled off and then reattached, or a hole may be made with a needle in a blistered portion of the pressure-sensitive adhesive sheet so as to allow the air to escape. However, in the case of sticking on in place of pressure-sensitive adhesive sheet, effort is required, and furthermore the cost is increased; moreover, in the case of reattaching the original pressure-sensitive adhesive sheet, problems often arise such as the pressure-sensitive adhesive sheet tearing, or wrinkles forming on the surface, or the adhesiveness dropping. On the other hand, the method of making a hole with a needle mars the appearance of the pressure-sensitive adhesive sheet.

To prevent air entrapment from occurring, there is a method in which water is put onto the adherend or the pressure-sensitive adhesive surface in advance before the two are stuck together; however, in the case of sticking on a pressure-sensitive adhesive sheet having large dimensions such as a scattering glass preventing film stuck onto a window, a decorative film or a marking film, much time and effort is required. Moreover, there is a method in which air entrapment is prevented from occurring by sticking on the pressure-sensitive adhesive sheet using a device rather than by hand; however, depending on the use of the pressure-sensitive adhesive sheet or the site or shape of the adherend, it may not be possible to use such a device for sticking on the pressure-sensitive adhesive sheet.

Meanwhile, a resin material such as an acrylic resin, an ABS resin, a polystyrene resin or a polycarbonate resin may emit a gas upon heating or even with no heating; in the case of sticking a pressure-sensitive adhesive sheet onto an adherend made of such a resin material, blistering may occur on the pressure-sensitive adhesive sheet due to the gas emitted from the adherend.

Moreover, in the case of sticking a pressure-sensitive adhesive sheet onto an adherend made of a resin through which gas readily permeates, gas that has permeated through may build up between the adherend and the pressure-sensitive adhesive sheet, so that the pressure-sensitive adhesive sheet blisters or peels off. For example, in the case that a marking sheet is stuck onto a polyethylene resin gasoline tank of a motorbike, vapor of gasoline in the gasoline tank may vaporize so as to permeate through the polyethylene resin layer of the gasoline tank, so that the marking sheet blisters or peels off, bringing about an undesirable situation such as the appearance being marred.

To solve such problems, in Japanese Utility Model Registration No. 2503717 and Japanese Utility Model Registration No. 2587198, there is proposed a pressure-sensitive adhesive sheet in which a large number of independent small protruding portions are disposed scattered over a pressure-sensitive adhesive surface of a pressure-sensitive adhesive layer. In this pressure-sensitive adhesive sheet, a state is maintained in which the tips of the small protruding portions of the pressure-sensitive adhesive layer are in close contact with the adherend and hence a basic flat surface of the pressure-sensitive adhesive layer is separated away from the adherend, whereby gaps that communicate with the outside arise between the basic flat surface of the pressure-sensitive adhesive layer and the adherend, and hence air or gas can escape to the outside from these gaps, thus preventing air entrapment or blistering of the pressure-sensitive adhesive sheet.

DISCLOSURE OF THE INVENTION

Problem to be Solved by the Invention

However, with the pressure-sensitive adhesive sheet disclosed in Japanese Utility Model Registration No. 2503717 and Japanese Utility Model Registration No. 2587198, there have been problems that, because only the tips of the small protruding portions of the pressure-sensitive adhesive layer are stuck to the adherend, the adhesive strength is weak, and moreover water, chemicals and so on readily infiltrate in between the pressure-sensitive adhesive layer and the adherend, whereby the adhesive strength further drops. Even if such a pressure-sensitive adhesive sheet is strongly pressed against the adherend, the adhesive strength is still not adequate due to the influence of the small protruding portions of the pressure-sensitive adhesive layer. Moreover, in this case, the gaps communicating with the outside are filled in, and hence blistering that occurs when gas is emitted from the adherend cannot be prevented.

The present invention has been devised in view of the above state of affairs; it is an object of the present invention to provide a pressure-sensitive adhesive sheet according to which air entrapment and blistering can be prevented or eliminated while securing adequate adhesive strength and with no marring of the appearance of the pressure-sensitive adhesive sheet, a method of manufacturing such a pressure-sensitive adhesive sheet, a release liner that can be used in the manufacture of such a pressure-sensitive adhesive sheet, and a method of manufacturing such a release liner.

Means for Solving the Problem

To attain the above object, firstly, the present invention provides a pressure-sensitive adhesive sheet comprising a base material, and a pressure-sensitive adhesive layer laminated on the base material, the pressure-sensitive adhesive sheet characterized in that gas-passing channels that communicate to the outside of the pressure-sensitive adhesive sheet are formed in at least the pressure-sensitive adhesive layer side of the base material, a plurality of through holes passing through the pressure-sensitive adhesive layer in a thickness direction are formed in the pressure-sensitive adhesive layer, the gas-passing channels in the base material and the through holes in the pressure-sensitive adhesive layer communicate with one another, and the through holes in the pressure-sensitive adhesive layer are formed so as to have a prescribed diameter through gas from holes in a release liner laminated onto a pressure-sensitive adhesive surface of the pressure-sensitive adhesive layer passing through the pressure-sensitive adhesive layer, the through holes being formed not randomly but rather in prescribed positions in the pressure-sensitive adhesive layer (invention 1). Note that in this pressure-sensitive adhesive sheet, the release liner may be peeled off and thus not present.

Here, the base material may be a single layer, or may comprise a plurality of layers. Note that in the present specification, "sheet" is deemed to include the idea of a film, and "film" is deemed to include the idea of a sheet.

According to the pressure-sensitive adhesive sheet of the above invention (invention 1), air between an adherend and the pressure-sensitive adhesive surface escapes from the through holes to the outside of the pressure-sensitive adhesive sheet front surface, and hence air tends not to be caught up when sticking the pressure-sensitive adhesive sheet to the adherend, i.e. air entrapment can be prevented from occurring. Even if air is caught up so that air entrapment occurs, by re-pressing the air-entrapped portion or an air-entrapped portion surrounding portion including the air-entrapped portion, the air can be made to escape from the through holes to the outside of the pressure-sensitive adhesive sheet front surface, thus eliminating the air entrapment. Moreover, even if gas is emitted from the adherend after the pressure-sensitive adhesive sheet has been stuck onto the adherend, the gas will escape from the through holes to the outside of the pressure-sensitive adhesive sheet front surface, whereby blistering can be prevented from occurring.

Furthermore, the plurality of through holes in the pressure-sensitive adhesive layer are formed independent of one another, and hence infiltration of water, a chemical, or the like in between the pressure-sensitive adhesive surface of the pressure-sensitive adhesive layer and the adherend can be prevented effectively.

In the case of the above invention (invention 1), the through holes in the pressure-sensitive adhesive layer preferably have a diameter of 0.1 to 2000 µm, and a number density of 30 to 100,000 per 100 $cm^2$ (invention 2). According to this invention (invention 2), a pressure-sensitive adhesive sheet for which air escaping ability is excellent and adequate adhesive strength can be secured can be obtained.

In the case of the above inventions (inventions 1 and 2), a release liner may be laminated onto a pressure-sensitive adhesive surface of the pressure-sensitive adhesive layer, a plurality of bottomed holes that open out on a release treated surface side of the release liner being formed in the release liner in prescribed positions at a prescribed number density (invention 3). By using such a release liner, the through holes in the pressure-sensitive adhesive layer can be formed efficiently in prescribed positions (e.g. in positions enabling communication with the gas-passing channels in the base material) at a prescribed number density.

Secondly, the present invention provides a method of manufacturing a pressure-sensitive adhesive sheet, characterized by manufacturing a release liner having a plurality of bottomed holes that open out on a release treated surface side thereof formed therein in prescribed positions at a prescribed number density, forming a pressure-sensitive adhesive layer on the release treated surface of the release liner, and making gas from the holes in the release liner move to the outside of the pressure-sensitive adhesive layer, to form in the pressure-sensitive adhesive layer so as to have a prescribed diameter a plurality of through holes passing through the pressure-sensitive adhesive layer in a thickness direction, and laminating the pressure-sensitive adhesive layer onto one surface of a base material having gas-passing channels that communicate to the outside of the pressure-sensitive adhesive sheet formed in at least the one surface thereof, such that the gas-passing channels in the base material and the through holes in the pressure-sensitive adhesive layer communicate with one another (invention 4).

According to the above invention (invention 4), the through holes are formed in the pressure-sensitive adhesive layer using a release liner having holes formed therein in prescribed positions at a prescribed number density, and hence the through holes in the pressure-sensitive adhesive layer can be formed corresponding to the holes in the release liner in prescribed positions (e.g. in positions enabling communication with the gas-passing channels in the base material) at a prescribed number density.

In the case of the above invention (invention 4), a support of the release liner is preferably made of a material containing air and/or moisture (invention 5). Through the support of the release liner being made of such a material, upon the pressure-sensitive adhesive layer being laminated on and the release liner being heated, not only air present in the holes in the release liner, but also air contained in the support of the release liner expands, and moreover moisture contained in the support vaporizes to form water vapor, and hence the amount of gas moving through the pressure-sensitive adhesive layer is increased, whereby the through holes can be formed more efficiently.

In the case of the above invention (invention 5), a gas barrier layer is preferably formed in advance on a non-release treated surface side of the support of the release liner (invention 6). By forming a gas barrier layer in this way, gas such as air or water vapor can be prevented from escaping from the non-release treated surface side of the support, and hence more gas can be introduced into the pressure-sensitive adhesive layer from the holes in the release liner, whereby the through holes can be formed more efficiently.

In the case of the above inventions (inventions 4 to 6), the holes in the release liner preferably have a diameter of 0.1 to 2000 µm, and a number density of 30 to 100,000 per 100 $cm^2$ (invention 7). By setting the diameter and number density of the holes in the release liner in this way, the through holes formed in the pressure-sensitive adhesive layer can be made to have a diameter of 0.1 to 2000 µm, and a number density of 30 to 100,000 per 100 $cm^2$, and hence a pressure-sensitive adhesive layer for which air escaping ability is excellent and adequate adhesive strength can be secured can be obtained.

Thirdly, the present invention provides a release liner characterized by having a plurality of bottomed holes that open out on a release treated surface side thereof formed therein in prescribed positions at a prescribed number density (invention 8). According to such a release liner, by making gas from the holes in the release liner move to the outside of a pressure-sensitive adhesive layer formed on the release treated surface of the release liner, through holes can be formed in the pressure-sensitive adhesive layer in prescribed positions (e.g. in positions enabling communication with gas-passing channels in a base material) at a prescribed number density.

In the case of the above invention (invention 8), the holes are preferably formed by hole formation processing carried out from the release treated surface side of the release liner or a side of one surface of a support of the release liner so as not to pass through the release liner or the support (invention 9). Examples of the type of hole formation processing include laser processing, fusing perforation, a hot needle, a microdrill, precision pressing, and a water jet. Through such hole formation processing, the holes can be formed in the release liner in prescribed positions at a prescribed number density.

In the case of the above inventions (inventions 8 and 9), the holes preferably have a diameter of 0.1 to 2000 μm, and a number density of 30 to 100,000 per 100 cm² (invention 10).

Fourthly, the present invention provides a method of manufacturing a release liner, characterized by comprising a step of carrying out hole formation processing from a release treated surface side of a release liner or a side of one surface of a support of the release liner so as not to pass through the release liner or the support, thus forming a plurality of bottomed holes that open out on the release treated surface side or the side of the one surface in prescribed positions at a prescribed number density (invention 11). According to this invention (invention 11), the release liner of the above invention (invention 8) can be manufactured efficiently.

In the case of the above invention (invention 11), the support of the release liner is preferably made of a material containing air and/or moisture (invention 12), and in this case, a gas barrier layer is preferably formed in advance on a non-release treated surface side of the support of the release liner (invention 12).

Moreover, in the case of the above inventions (inventions 11 to 13), the holes in the release liner preferably have a diameter of 0.1 to 2000 μm, and a number density of 30 to 100,000 per 100 cm² (invention 14).

Specifically, the release liner can be manufactured, for example, using:

(1) a method in which hole formation processing is carried out from the release treated surface side of the release liner (which may have, or may be without, a release agent layer, or a release agent layer and an undercoat layer, a gas barrier layer, etc.) so as not to pass through the release liner;

(2) a method in which hole formation processing is carried out from a side of one surface of a support of the release liner so as not to pass through the support, and then a release agent layer is formed on the side of the one surface of the support, and gas from holes formed in the support is made to move to the outside of the release agent layer, thus forming in the release agent layer so as to have a prescribed diameter through holes passing through the release agent layer in a thickness direction;

(3) a method in which, in the case of method (2) above, after the hole formation processing has been carried out on the support of the release liner but before the release agent layer is formed, an undercoat layer is formed on the one surface of the support, and gas from the holes formed in the support is made to move to the outside of the undercoat layer, thus forming in the undercoat layer so as to have a prescribed diameter through holes passing through the undercoat layer in the thickness direction; or (4) a method in which hole formation processing is carried out from a side of one surface of a support of the release liner so as not to pass through the support, and then an undercoat layer and a release agent layer are formed in this order on the one surface of the support, and gas from holes formed in the support is made to move to the outside of the release agent layer, thus forming in the undercoat layer and the release agent layer so as to have a prescribed diameter through holes passing through the undercoat layer and the release agent layer in a thickness direction.

ADVANTAGEOUS EFFECT OF THE INVENTION

According to the present invention, there can be obtained a pressure-sensitive adhesive sheet according to which air entrapment and blistering can be prevented or eliminated while securing adequate adhesive strength and with no marring of the appearance of the pressure-sensitive adhesive sheet.

Figure 1:
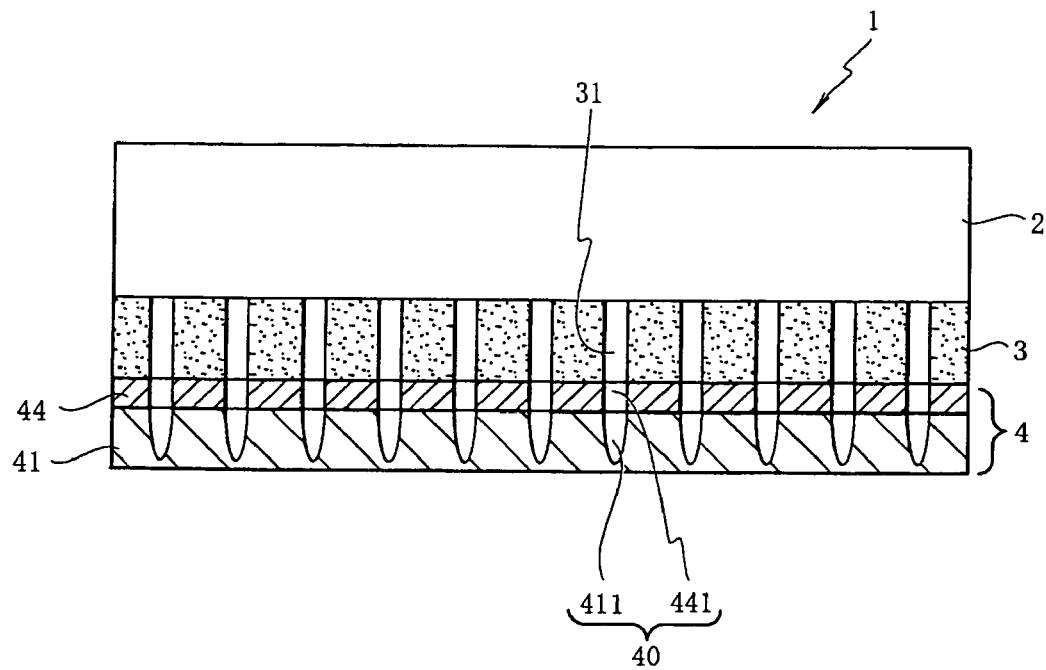
FIG. 1 is a sectional view of a pressure-sensitive adhesive sheet according to a first embodiment of the present invention.

EXPLANATION OF REFERENCE NUMERALS 1, 1A: Pressure-sensitive adhesive sheet
2, 2A: Base material
3, 3A: Pressure-sensitive adhesive layer
31, 31A: Through hole
4, 4A: Release liner
40, 40A, 411, 411A: Hole
431A, 441, 441A: Through hole
41, 41A: Support
42A: Gas barrier layer
43A: Undercoat layer
44, 44A: Release agent layer

BEST MODE FOR CARRYING OUT THE INVENTION

Following is a description of embodiments of the present invention.

First Embodiment

Pressure-Sensitive Adhesive Sheet

FIG. 1 is a sectional view of a pressure-sensitive adhesive sheet 1 according to a first embodiment of the present invention.

As shown in FIG. 1, the pressure-sensitive adhesive sheet 1 according to the present embodiment comprises a base material 2, a pressure-sensitive adhesive layer 3, and a release liner 4 laminated on one another. Note, however, that the release liner 4 is peeled off when using the pressure-sensitive adhesive sheet 1.

[Release Liner]

The release liner 4 in the present embodiment is constituted from a support 41, and a release agent layer 44 formed on one surface (the upper surface in FIG. 1) of the support 41. The release liner 4 also has formed therein in prescribed positions at a prescribed number density a plurality of bottomed holes 40 that open out on the release agent layer 44 surface (release treated surface) side.

Figure 2:
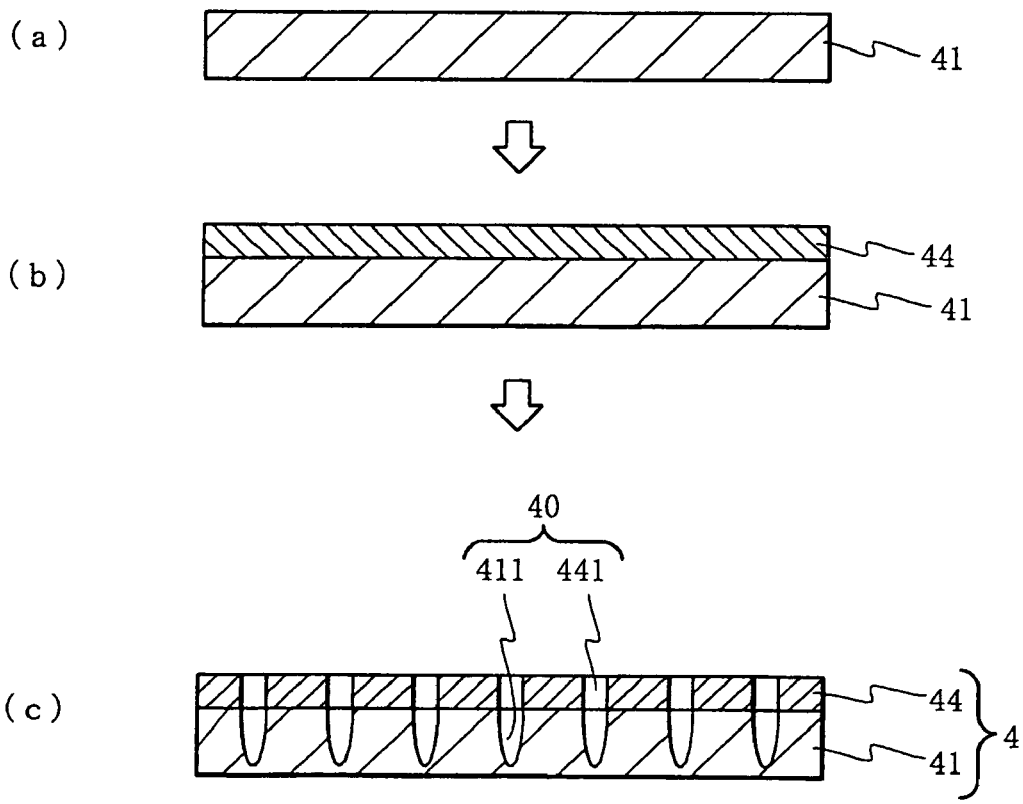
FIG. 2 consists of sectional views showing an example of a method of manufacturing a release liner in the pressure-sensitive adhesive sheet according to the first embodiment.
Figure 3:
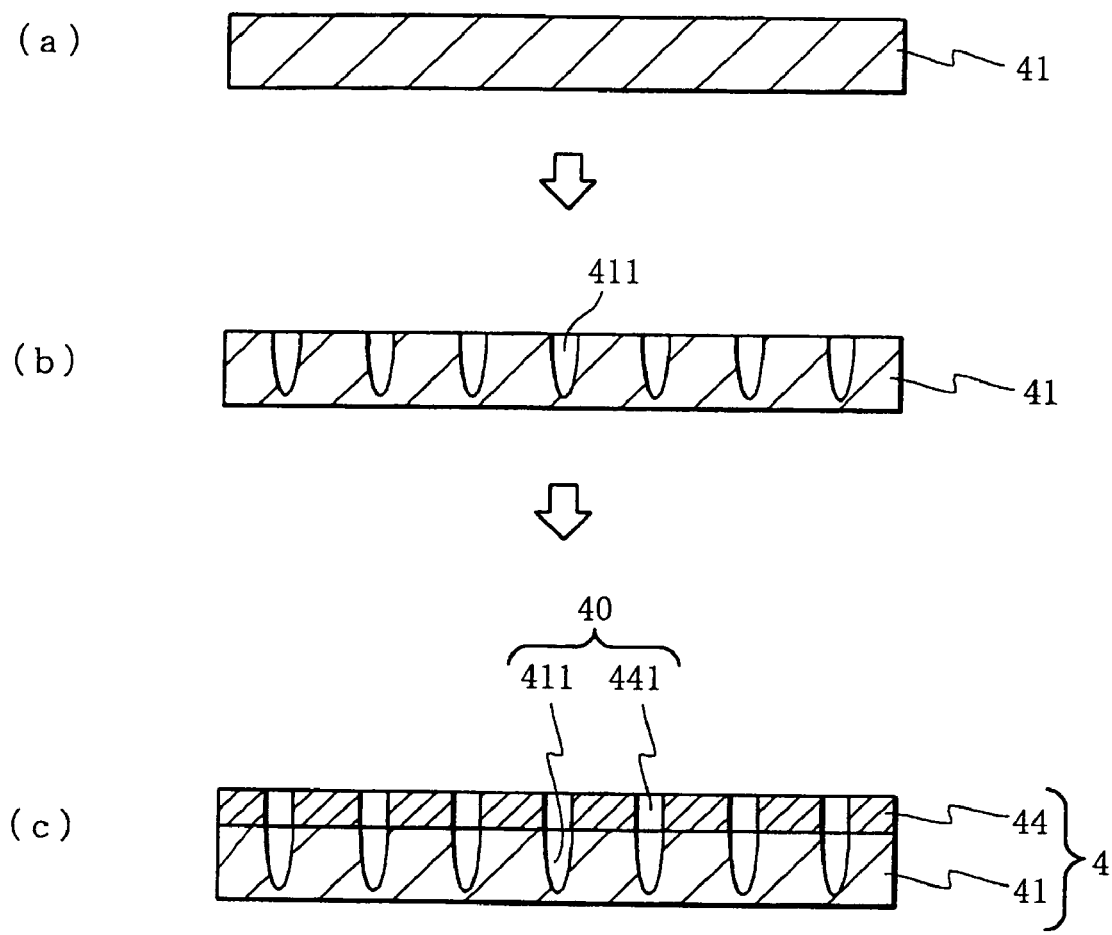
FIG. 3 consists of sectional views showing another example of a method of manufacturing the release liner in the pressure-sensitive adhesive sheet according to the first embodiment.

Such a release liner 4 can be manufactured, for example, using a first method shown in FIG. 2 or a second method shown in FIG. 3.

In the first method, first, the support 41 of the release liner 4 is prepared as shown in FIG. 2(a). There are no particular limitations on the support 41 so long as the support 41 is made of a material in which holes 411, described below, can be formed. For example, any of various types of paper such as woodfree paper or glassine paper, a nonwoven cloth, a film made of a resin such as polyethylene terephthalate, polypropylene or polyethylene, or a foamed film obtained by foaming such a resin can be used, although as described below, it is preferable to use a material containing air, moisture or the like such as any of various types of paper, a nonwoven cloth, or a foamed film.

The thickness of the support 41 is generally approximately 10 to 250 μm, preferably approximately 20 to 200 μm. Moreover, in the case that the support 41 comprises a foamed film, the voidage thereof is preferably 3 to 80%, particularly preferably 5 to 60%. In the case that the support 41 comprises paper or a nonwoven cloth, the basis weight thereof is preferably 10 to 150 g/m², particularly preferably 20 to 130 g/m². Furthermore, in the case that the support 41 comprises paper, the moisture content thereof is preferably 0.5 to 20 wt %; this moisture content can be adjusted as appropriate in consideration of the efficiency of through hole formation, described below.

Note that in the present specification, the voidage is represented by the following formula.

$$\text{Voidage}(\%) = (W_2 - W_1)/W_2 \cdot 100$$

$W_1$: Weight per unit volume of material in case that material has foam cells therein $W_2$: Weight per unit volume of material in case that material does not have foam cells therein.

As shown in FIG. 2(b), a release agent is coated onto one surface of the support 41 (the upper surface in FIG. 2) so as to form the release agent layer 44. As the release agent, for example a silicone type one, a fluorine type one, a long chain alkyl group-containing carbamate, or the like can be used. Moreover, the coating on of the release agent can be carried out, for example, using a coater such as a roll coater, a knife coater, a roll knife coater, an air knife coater, a die coater, a bar coater, a gravure coater, or a curtain coater.

The thickness of the release agent layer 44 is preferably 0.01 to 3.0 μm, particularly preferably 0.05 to 2.0 μm.

Next, as shown in FIG. 2(c), hole formation processing is carried out from the release agent layer 44 surface side so as not to pass through the laminate, thus forming the bottomed holes 40.

Examples of the hole formation processing method include laser processing, fusing perforation (a hole formation processing method of Nidaiki Corporation), a hot needle, a micro-drill, precision pressing, and a water jet; of these, it is particularly preferable to use laser processing, fusing perforation or a hot needle, which enable holes 40 having a desired diameter and depth to be formed easily at a desired number density.

The diameter of the holes 40 is preferably 0.1 to 2000 μm, particularly preferably 10 to 1500 μm. The number density of the holes 40 is preferably 30 to 100,000 per 100 cm², particularly preferably 100 to 50,000 per 100 cm². The depth of the holes 40 is preferably 3 to 250 μm, particularly preferably 5 to 200 μm. Through the diameter, number density, and depth of the holes 40 being made to be in the above ranges, air escaping ability is good, and a pressure-sensitive adhesive layer 3 for which adequate adhesive strength can be secured can be obtained. The positions in which the holes 40 are formed are preferably made to be positions corresponding to gas-passing channels in the base material.

Next, the second method will be described. Note that as the materials of the support 41 and the release agent layer 44 in the second method, the same ones as used in the first method may be used.

In the second method, first, as shown in FIGS. 3(a) and 3(b), hole formation processing is carried out from the side of one surface (the upper surface in FIG. 3) of the support 41 so as not to pass through the support 41, thus forming the bottomed holes 411 in the support 41. The diameter, depth, number density, and positions of the holes 411 are preferably set to be approximately the same as the diameter, depth, number density, and positions of the holes 40 described above.

After the holes 411 have been formed in the support 41, as shown in FIG. 3(c), the release agent layer 44 is formed on the surface of the support 41 on the side where the holes 411 open out (the upper surface in FIG. 3). At this time, the release agent layer 44 is formed such that through holes 441 can be formed therein in positions corresponding to the holes 411 in the support 41.

Specifically, through holes 441 having a prescribed diameter are formed in the release agent layer 44 by making air present in the holes 411 in the support 41 or gas such as air or water vapor contained in the support 41 move from the holes 411 in the support 41 to the outside of the release agent layer 44, or else the release agent is coated on such that the release agent layer 44 is not formed at the sites of the holes 411 in the support 41.

The movement of gas contained in the support 41 to the outside of the release agent layer 44 can be carried out, for example, by heating the support 41 on which the release agent layer 44 has been formed. Through this heating, air present in the holes 411 expands, and escapes to the outside while pushing the release agent layer 44 out of the way. Moreover, in the case that the support 41 is made of a material containing air, moisture or the like, air contained in the support 41 expands, or moisture vaporizes to form water vapor, and together with the air present in the holes 411, this air or water vapor escapes to the outside while pushing the release agent layer 44 out of the way on the side where the holes 411 open out. Parts through which such gas passes become the through holes 441 in the release agent layer 44.

The diameter and number density of the through holes 441 formed in the release agent layer 44 in this way are approximately the same as the diameter and number density of the holes 411 in the support 41.

Note that even in the case that through holes 441 having a diameter less than the prescribed diameter (0.1 μm) are formed in positions corresponding to the holes 411 in the support 41 when the release agent is coated on, by making gas pass through from the holes 411 in the support 41 as described above, the diameter of the through holes 441 in the release agent layer 44 can be increased to approximately the same size as the diameter of the holes 411 in the support 41.

[Pressure-Sensitive Adhesive Layer]

In the present embodiment, the pressure-sensitive adhesive layer 3 has a plurality of through holes 31 that pass through the pressure-sensitive adhesive layer 3 formed therein not randomly but rather in prescribed positions so as to be able to communicate with the gas-passing channels in the base material. Such a pressure-sensitive adhesive layer 3 can be formed as follows.

Figure 4:
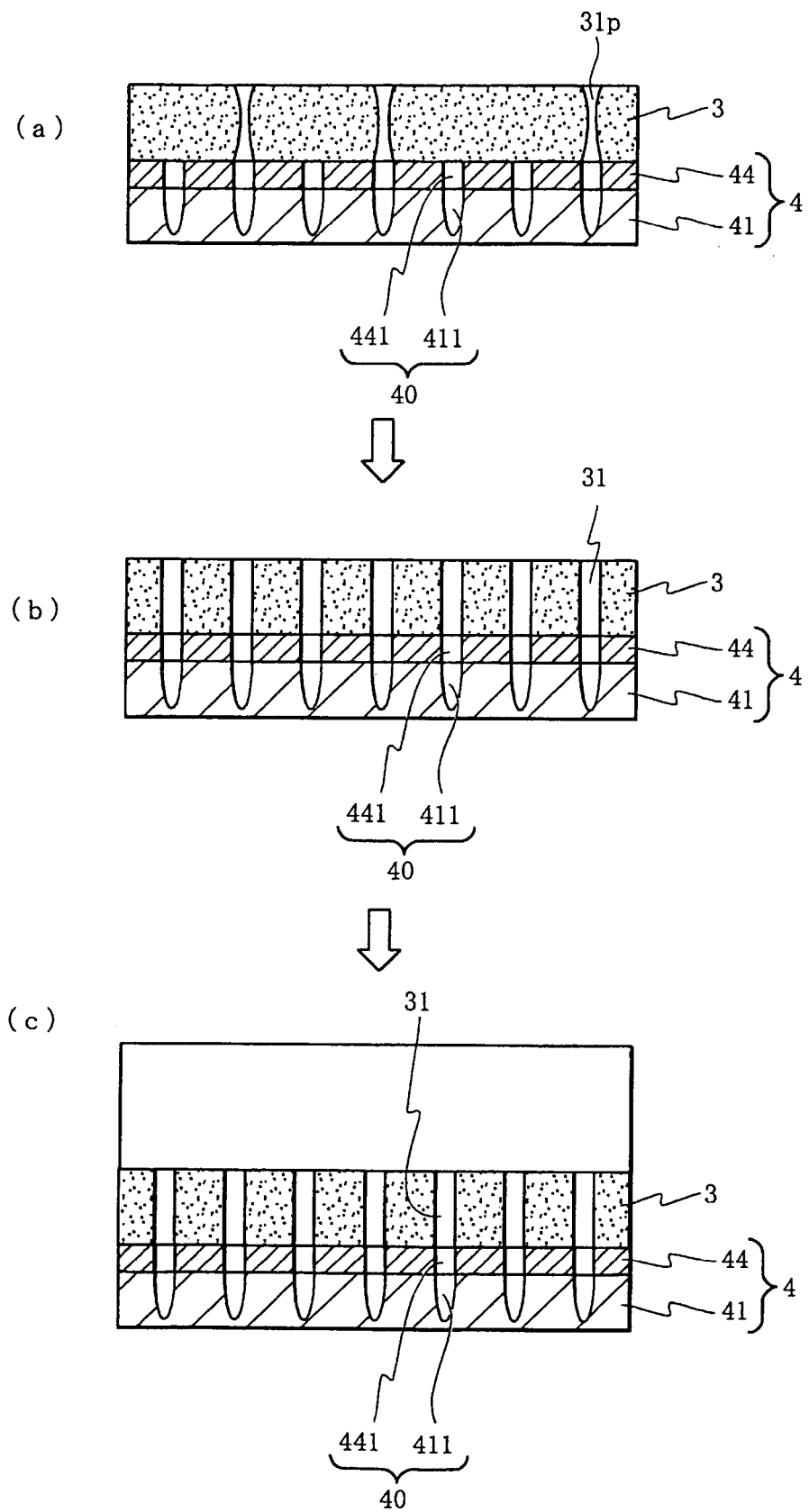
FIG. 4 consists of sectional views showing a method of manufacturing the pressure-sensitive adhesive sheet according to the first embodiment.

First, as shown in FIG. 4(*a*), a pressure-sensitive adhesive is coated onto the release treated surface of the release liner 4 (the surface of the release agent layer 44), so as to form the pressure-sensitive adhesive layer 3 (undried state). There are no particular limitations on the type of the pressure-sensitive adhesive so long as this pressure-sensitive adhesive is a material in which the through holes 31 can be formed; the pressure-sensitive adhesive may be any of an acrylic type, a polyester type, a polyurethane type, a rubber type, a silicone type, or the like. Moreover, the pressure-sensitive adhesive may be any of an emulsion type, a solvent type, or a solvent-less type, and may be either a crosslinked type that is subjected to thermal crosslinking, ionizing radiation crosslinking or the like, or a non-crosslinked type.

The thickness of the pressure-sensitive adhesive layer 3 (when dried) is preferably 1 to 300 μm, particularly preferably 3 to 100 μm, but may be changed as appropriate in accordance with the use of the pressure-sensitive adhesive sheet 1 and so on.

The pressure-sensitive adhesive layer 3 may be formed by preparing a coating agent containing the pressure-sensitive adhesive that will constitute the pressure-sensitive adhesive layer 3, and also a solvent if desired, and applying the coating agent onto the release agent layer 44 of the release liner 4 using a coater such as a roll coater, a knife coater, a roll knife coater, an air knife coater, a die coater, a bar coater, a gravure coater, or a curtain coater.

Here, the viscosity of the pressure-sensitive adhesive coating agent is preferably made to be not more than 20,000 mPa·s at 6 rpm with a B-type viscometer. If the viscosity of the pressure-sensitive adhesive coating agent is too high, then the movement of gas through the pressure-sensitive adhesive, described below, may be impeded, and moreover even if the through holes 31 are formed, rising up may occur around the openings of the through holes 31, resulting in a decrease in the surface smoothness of the pressure-sensitive adhesive layer 3.

Note that in FIG. 4(*a*), through holes 31*p* having a diameter less than the diameter of the holes 40 in the release liner 4 are formed in the pressure-sensitive adhesive layer 3 in some of the positions corresponding to the holes 40 in the release liner 4, but such through holes 31*p* are not necessarily formed when the pressure-sensitive adhesive is coated on, or may be formed in all of the positions corresponding to the holes 40 in the release liner 4.

Next, as shown in FIG. 4(*b*), air present in the holes 40 in the release liner 4 (the holes 411 in the support 41 and the through holes 441 in the release agent layer 44) or gas such as air or water vapor contained in the support 41 of the release liner 4 is made to move from the holes 40 in the release liner 4 to the outside of the pressure-sensitive adhesive layer 3, thus forming the through holes 31 in the pressure-sensitive adhesive layer 3. In the case of using a material containing air, moisture or the like as the support 41 of the release liner 4, compared with the case of using only the air present in the holes 40 in the release liner 4, the amount of gas moving through the pressure-sensitive adhesive can be increased, and hence the through holes 31 can be formed in the pressure-sensitive adhesive layer 3 more efficiently.

The movement (rising) of the gas through the pressure-sensitive adhesive may be allowed to take place naturally through the buoyancy of the gas, or may be brought about by heating the pressure-sensitive adhesive layer 3 and the release liner 4 so as to dry the pressure-sensitive adhesive layer 3. When the gas moves through the pressure-sensitive adhesive, the gas escapes to the outside of the pressure-sensitive adhesive layer 3 while pushing the pressure-sensitive adhesive out of the way, and hence the parts through which the gas passes become the through holes 31 in the pressure-sensitive adhesive layer 3.

In the case of heating the pressure-sensitive adhesive layer 3 and the release liner 4, air present in the holes 40 in the release liner 4 or in the support 41 expands, or moisture contained in the support 41 vaporizes to form water vapor, and hence the amount of gas that moves through the pressure-sensitive adhesive layer 3 increases, whereby the through holes 31 can be formed more efficiently. By changing the heating temperature, the heating pattern and soon, the size (diameter) of the through holes 31 formed in the pressure-sensitive adhesive layer 3 can be controlled. The heating temperature is preferably in a range of room temperature to 150° C.

In the case that the support 41 of the release liner 4 is made of a material containing air, moisture or the like, upon the above heating, gas such as air or water vapor in the support 41 moves to the outside of the pressure-sensitive adhesive layer 3 together with the air present in the holes 411 in the support 41 and the through holes 441 in the release agent layer 44, whereby the through holes 31 are formed.

The diameter and number density of the through holes 31 formed in the pressure-sensitive adhesive layer 3 are preferably approximately the same as the diameter and number density of the holes 40 in the release liner 4, but may differ so long as they are within the following ranges. That is, the diameter of the through holes 31 is preferably 0.1 to 2000 μm, particularly preferably 0.5 to 1500 μm. If the diameter of the through holes 31 is less than 0.1 μm, then it will be difficult for gas to pass through the through holes 31, whereas if the diameter of the through holes 31 is greater than 2000 μm, then the adhesive strength of the pressure-sensitive adhesive layer 3 may decrease.

The number density of the through holes 31 is preferably 30 to 100,000 per 100 $cm^2$, particularly preferably 100 to 50,000 per 100 $cm^2$. If the number density of the through holes 31 is less than 30 per 100 $cm^2$, then it will be difficult for gas to escape, whereas if the number density of the through holes 31 is greater than 100,000 per 100 $cm^2$, then the adhesive strength of the pressure-sensitive adhesive layer 3 may decrease.

The ratio of the number density of the through holes 31 in the pressure-sensitive adhesive layer 3 to the holes 40 in the release liner 4 (number density of through holes 31 in pressure-sensitive adhesive layer 3/number density of holes 40 in release liner 4) is preferably 0.3 to 1, particularly preferably 0.6 to 1, most preferably 1. If the ratio of the number density of the through holes 31 in the pressure-sensitive adhesive layer 3 to the holes 40 in the release liner 4 is less than 0.3, then the air escaping performance expected from the number density of the holes 40 in the release liner 4 may no longer be obtained adequately.

Note that the diameter of the through holes 31*p* formed in the pressure-sensitive adhesive layer 3 when the pressure-sensitive adhesive is coated on (which is smaller than the diameter of the holes 40 in the release liner 4) can be increased to the desired size through the gas passing through from the holes 40 in the release liner 4 as described above.

[Base Material]

In the present embodiment, there are no particular limitations on the base material 2 so long as gas-passing channels that communicate to the outside of the pressure-sensitive adhesive sheet 1 are formed in at least the pressure-sensitive adhesive layer 3 side of the base material 2; the gas-passing channels may be formed in the surface direction or the thickness direction of the pressure-sensitive adhesive sheet 1, or both of these directions. Examples of such a base material 2 include, for example, (1) one in which a plurality of recesses that continue as far as side edges of the base material 2 are provided in the pressure-sensitive adhesive layer 3 side of the base material 2, (2) one constituted from a base material, and a foam layer made of a foam containing open cells, and (3) one in which a plurality of through holes (holes minute enough that the appearance of the base material 2 is not marred) that pass through in the thickness direction of the base material 2 are formed.

In the case of the base material of (1), the recesses correspond to the gas-passing channels that communicate to the outside of the pressure-sensitive adhesive sheet, in the case of the base material of (2), the open cells in the foam layer correspond to the gas-passing channels that communicate to the outside of the pressure-sensitive adhesive sheet, and in the case of the base material of (3), the through holes correspond to the gas-passing channels that communicate to the outside of the pressure-sensitive adhesive sheet.

There are no particular limitations on the material of the base material 2 so long as this is a material which can have the above described gas-passing channels; examples include a resin film, a metal film, a resin film having a metal deposited thereon by vapor deposition, paper, nonwoven cloth, or a laminate of the above. These materials may contain any of various additives such as inorganic fillers, organic fillers, and ultraviolet absorbers.

The surface of the material may have a decorative layer formed thereon by a method such as printing, painting, transfer from a transfer sheet, vapor deposition, or sputtering, or may have formed thereon an undercoat layer such as an adhesion facilitating coat for forming such a decorative layer, or a gloss adjusting coat, or may have formed thereon a topcoat layer such as a hard coat or an antifouling coat. Moreover, such a decorative layer, undercoat layer or topcoat layer may be formed over the whole of the material surface, or may be formed on only part of the material surface.

As a resin film, there can be used, for example, a film or a foamed film made of a resin such as a polyolefin such as polyethylene or polypropylene, a polyester such as polyethylene terephthalate or polybutylene terephthalate, polyvinyl chloride, polystyrene, a polyurethane, a polycarbonate, a polyamide, a polyimide, polymethyl methacrylate, polybutene, polybutadiene, polymethylpentene, an ethylene-vinyl acetate copolymer, an ethylene-(meth)acrylic acid copolymer, an ethylene-(meth)acrylate ester copolymer, an ABS resin, or an ionomer resin, or a thermoplastic elastomer containing a component such as a polyolefin, a polyurethane, polystyrene, polyvinyl chloride or a polyester, or a laminated film of the above. Moreover, as paper, there can be used, for example, woodfree paper, glassine paper, coated paper, laminated paper, or the like.

Moreover, as the foam constituting the foam layer in the base material of (2), for example, a foam obtained by foaming a resin such as a poly(meth)acrylate ester, polystyrene, a polyurethane, polyethylene, polypropylene, polyvinyl chloride, cellulose acetate, rubber, or silicone can be used. Note, however, that the foam must contain open cells through which gas can pass.

The thickness of the base material 2 is generally approximately 1 to 500 μm, preferably 5 to 350 μm, but may be changed as appropriate in accordance with the use of the pressure-sensitive adhesive sheet 1.

The pressure-sensitive adhesive sheet 1 according to the present embodiment can be manufactured by superposing together the pressure-sensitive adhesive layer 3 having the through holes 31 formed therein and the base material 2 as shown in FIG. 4(c). At this time, the two are superposed together such that the through holes 31 in the pressure-sensitive adhesive layer 3 communicate with the gas-passing channels in the base material 2.

[Use of Pressure-Sensitive Adhesive Sheet 1]

When sticking the pressure-sensitive adhesive sheet 1 onto an adherend, the release liner 4 is peeled off from the pressure-sensitive adhesive layer 3, the pressure-sensitive adhesive surface of the exposed pressure-sensitive adhesive layer 3 is made to be in close contact with the adherend, and then the pressure-sensitive adhesive sheet 1 is pressed onto the adherend. At this time, air between the adherend and the pressure-sensitive adhesive surface of the pressure-sensitive adhesive layer 3 escapes from the throughholes 31 formed in the pressure-sensitive adhesive layer 3 via the gas-passing channels in the base material 2 to the outside of the side edges of the pressure-sensitive adhesive sheet 1, and hence air tends not to be caught up between the adherend and the pressure-sensitive adhesive surface, i.e. air entrapment is prevented from occurring. Even if air is caught up so that air entrapment occurs, by re-pressing the air-entrapped portion or an air-entrapped portion surrounding portion including the air-entrapped portion, the air can be made to escape from the through holes 31 in the pressure-sensitive adhesive layer 3 via the gas-passing channels in the base material 2 to the outside of the side edges of the pressure-sensitive adhesive sheet 1, thus eliminating the air entrapment. Such elimination of air entrapment is possible even after a long time has elapsed after the sticking on of the pressure-sensitive adhesive sheet 1.

Moreover, even if gas is emitted from the adherend after the pressure-sensitive adhesive sheet 1 has been stuck onto the adherend, this gas will escape from the through holes 31 formed in the pressure-sensitive adhesive layer 3 of the pressure-sensitive adhesive sheet 1 via the gas-passing channels in the base material 2 to the outside of the side edges of the pressure-sensitive adhesive sheet 1, whereby the pressure-sensitive adhesive sheet 1 is prevented from blistering.

Furthermore, the plurality of through holes 31 in the pressure-sensitive adhesive layer 3 are formed independent of one another, and hence infiltration of water, a chemical, or the like in between the pressure-sensitive adhesive surface of the pressure-sensitive adhesive layer 3 and the adherend can be prevented effectively.

Second Embodiment

Pressure-Sensitive Adhesive Sheet

Figure 5:
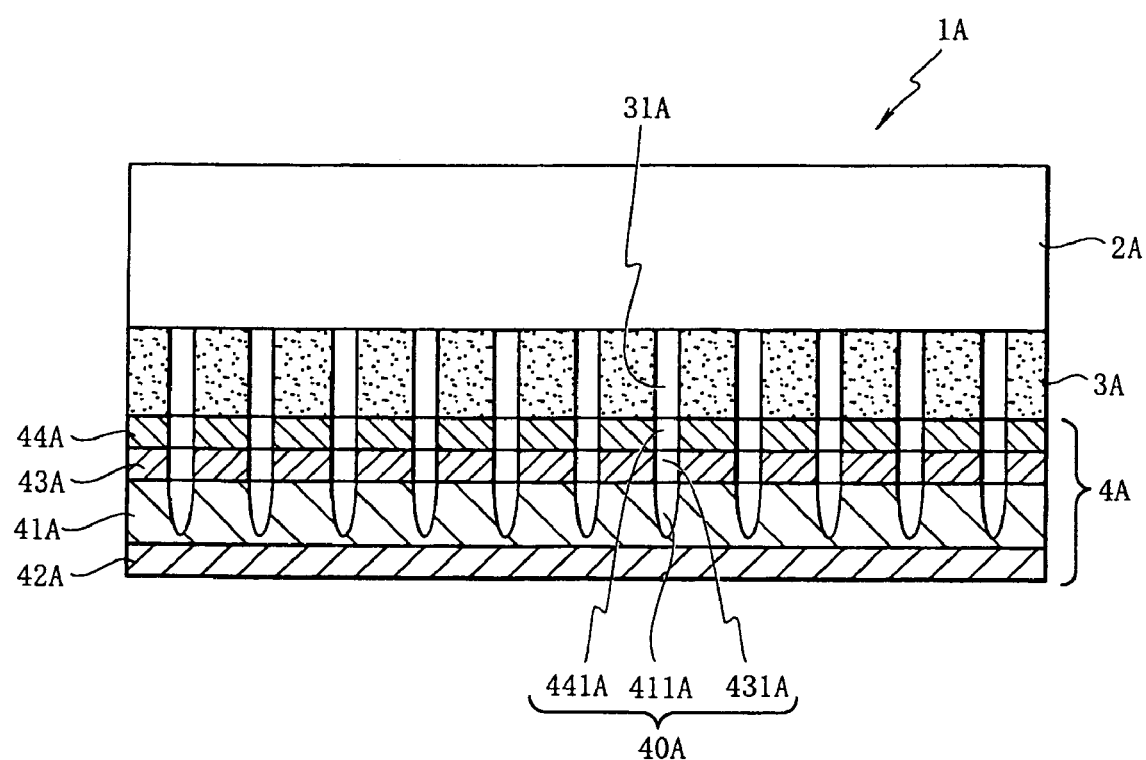
FIG. 5 is a sectional view of a pressure-sensitive adhesive sheet according to a second embodiment of the present invention.

FIG. 5 is a sectional view of a pressure-sensitive adhesive sheet 1A according to a second embodiment of the present invention.

As shown in FIG. 5, the pressure-sensitive adhesive sheet 1A according to the present embodiment comprises a base material 2A, a pressure-sensitive adhesive layer 3A, and a release liner 4A laminated on one another. Note, however, that the release liner 4A is peeled off when using the pressure-sensitive adhesive sheet 1A.

The release liner 4A in the present embodiment is constituted from a support 41A, a gas barrier layer 42A formed on one surface (the lower surface in FIG. 5) of the support 41A, an undercoat layer 43A formed on the other surface (the upper surface in FIG. 5) of the support 41A, and a release agent layer 44A formed on the undercoat layer 43A. The release liner 4A also has formed therein in prescribed positions at a prescribed number density a plurality of bottomed holes 40A that open out on the release agent layer 44A surface (release treated surface) side.

Figure 6:
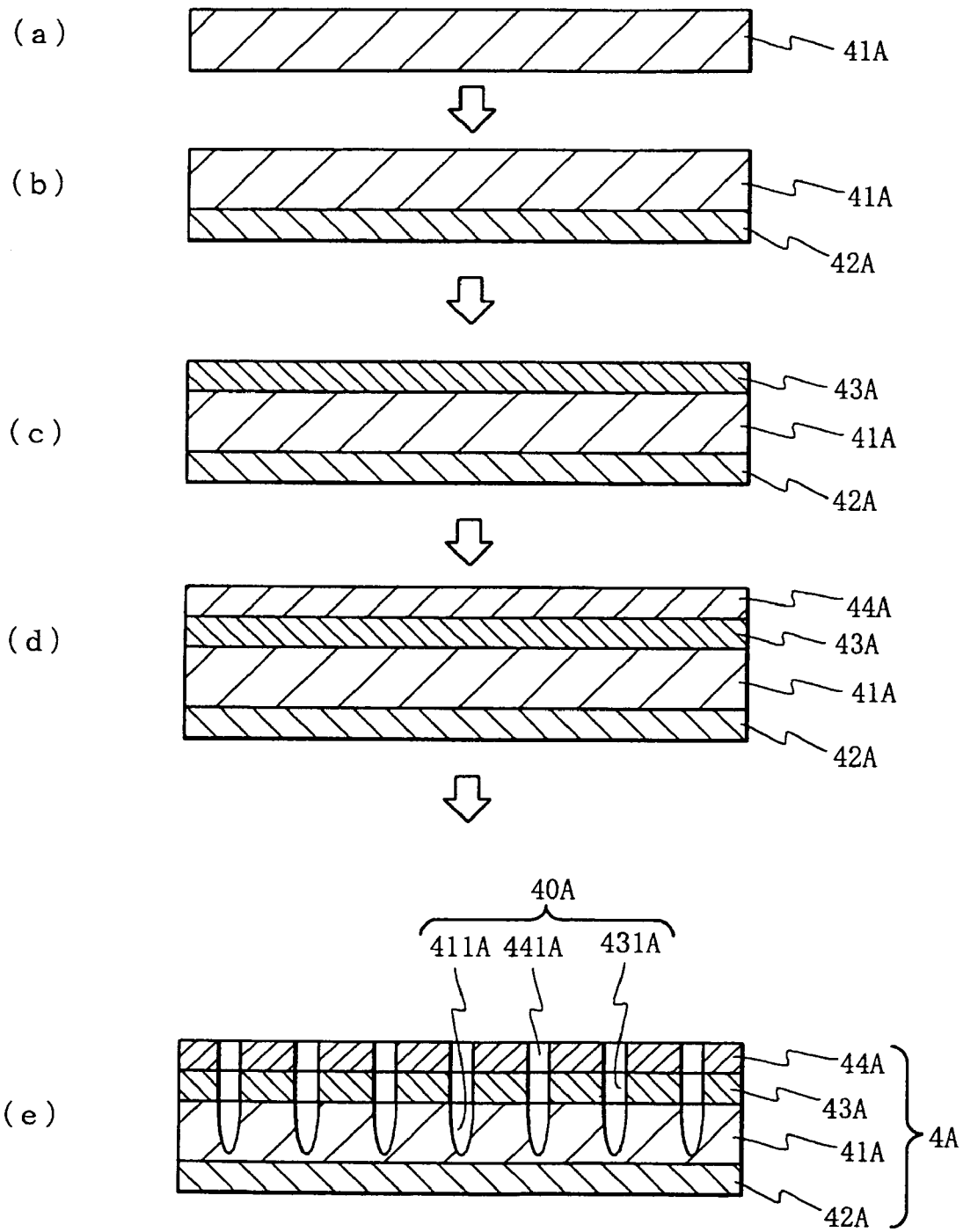
FIG. 6 consists of sectional views showing an example of a method of manufacturing a release liner in the pressure-sensitive adhesive sheet according to the second embodiment.
Figure 7:
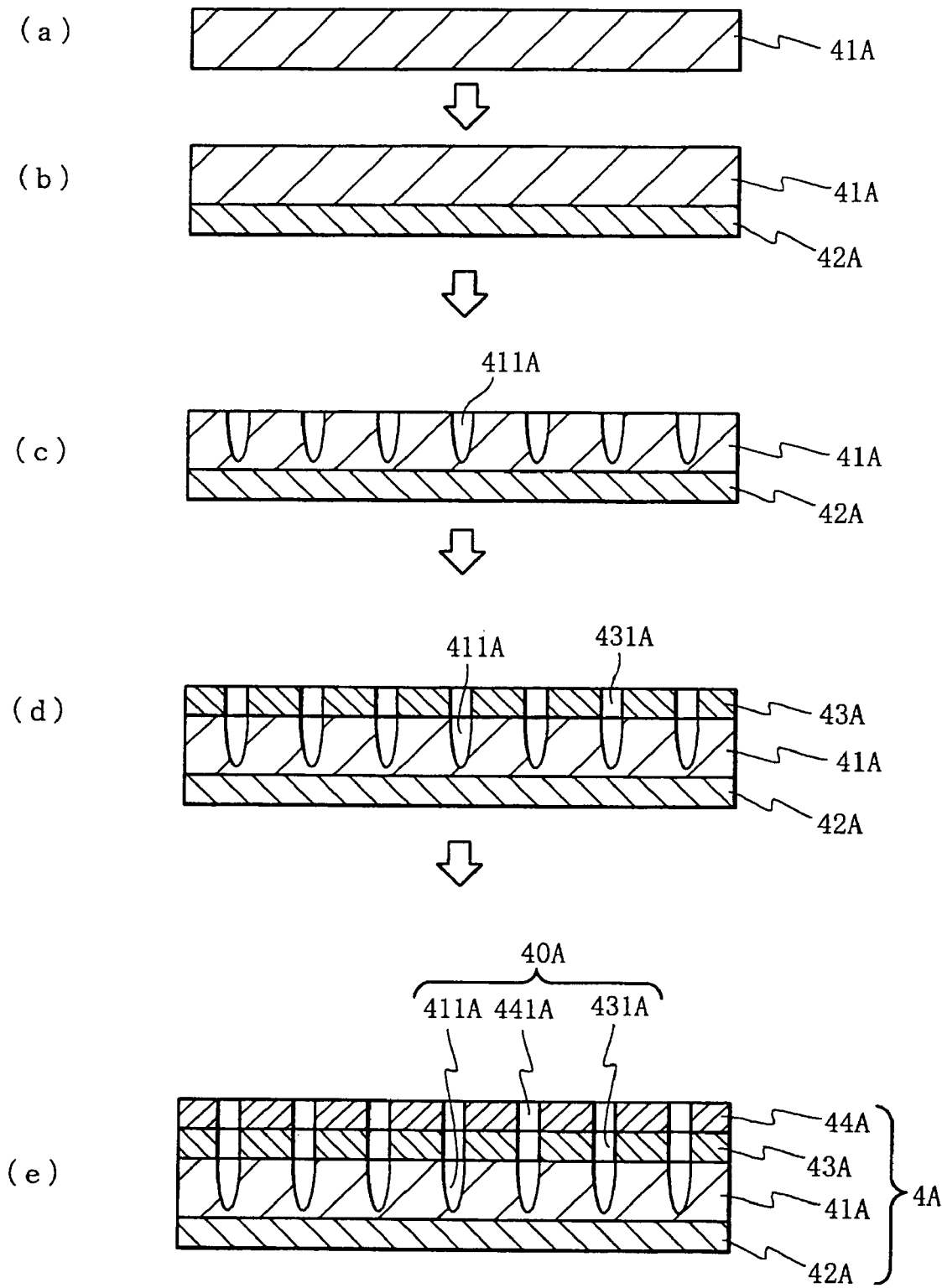
FIG. 7 consists of sectional views showing another example of a method of manufacturing the release liner in the pressure-sensitive adhesive sheet according to the second embodiment.

Such a release liner 4A can be manufactured, for example, using a first method shown in FIG. 6 or a second method shown in FIG. 7. Note that as the materials of the support 41A and the release agent layer 44A of the release liner 4A in the present embodiment, the same ones as for the support 41 and the release agent layer 44 of the release liner 4 in the first embodiment described above can be used.

In the first method, first, as shown in FIGS. 6(a) and 6(b), a layer having low gas permeability, i.e. the gas barrier layer 42A, is formed on one surface (the lower surface in FIG. 6) of the support 41A. Such a gas barrier layer 42A can be formed, for example, by coating on a resin such as a polyethylene, a polypropylene, a polyvinyl alcohol, an acrylic resin, a polyester, an epoxy resin, an ethylene-vinyl acetate copolymer, or an ethylene-vinyl alcohol copolymer, or by laminating on a film made of such a resin. The thickness of the gas barrier layer 42A is generally approximately 1 to 50 µm, preferably 5 to 30 µm.

Next, as shown in FIG. 6(c), the undercoat layer 43A is formed on the other surface (the upper surface in FIG. 6) of the support 41A. The undercoat layer 43A may be a layer made of a filler, or may be a layer made of a laminating resin. Due to such a layer, impregnation of a release agent into the support 41A can be prevented, or the smoothness of the release agent layer 44A can be improved.

As a filler, for example a resin such as a polyvinyl alcohol, a starch, a styrene-butadiene rubber (SBR), an acrylic resin, a polyester, or polyethylene, mixed with a filling agent such as clay or talc as required can be used.

The coating on of the filler can be carried out, for example, using a coater such as a roll coater, a knife coater, a roll knife coater, an air knife coater, a die coater, a bar coater, a gravure coater, or a curtain coater.

As a laminating resin, for example a resin such as polyethylene or polypropylene can be used; the laminating may be carried out using an ordinary method.

The thickness of the undercoat layer 43A is preferably 0.1 to 35 µm, particularly preferably 0.5 to 20 µm.

Next, as shown in FIG. 6(d), a release agent is coated onto the undercoat layer 43A so as to form the release agent layer 44A. The formation of the release agent layer 44A can be carried out as for the release agent layer 44 of the release liner 4 in the first embodiment described above.

After a laminate (having a four-layer structure in the present embodiment) has been obtained in this way, as shown in FIG. 6(e), hole formation processing is carried out from the release agent layer 44A surface side so as not to pass through the laminate, thus forming the bottomed holes 40A. Note that the holes 40A shown in FIGS. 5 to 7 are constituted from through holes 441A in the release agent layer 44A, through holes 431A in the undercoat layer 43A, and bottomed holes 411A in the support 41A, but the holes 40A may instead be formed in only the release agent layer 44A and the undercoat layer 43A (in this case, there are no holes 411A in the support 41A), or may reach as far as the gas barrier layer 42A (in this case, the holes 411A in the support 41A pass through the support 41A).

The hole formation processing can be carried out as for the hole formation processing for the release liner 4 in the first embodiment described above.

Next, the second method will be described. Note that as the materials of the gas barrier layer 42A and the undercoat layer 43A in the second method, the same ones as used in the first method described above may be used.

In the second method, as in the first method, the gas barrier layer 42A is formed as shown in FIG. 7(b) on one surface (the lower surface in FIG. 7) of the support 41A so as to obtain a laminate having a two-layer structure, and then as shown in FIG. 7(c), hole formation processing is carried out from the side of the other surface (the upper surface in FIG. 7) of the support 41A so as not to pass through the laminate, thus forming the bottomed holes 411A in the support 41A. The diameter, depth, number density, and positions of the holes 411A are preferably set to be approximately the same as the diameter, depth, number density, and positions of the holes 40A described above.

After the holes 411A have been formed in the support 41A, as shown in FIG. 7(d), the undercoat layer 43A is formed on the surface of the support 41A on the side where the holes 411A open out (the upper surface in FIG. 7). At this time, the undercoat layer 43A is formed such that the through holes 431A can be formed therein in positions corresponding to the holes 411A in the support 41A. The undercoat layer 43A may be a layer made of a filler, or may be a layer made of a laminating resin.

Specifically, through holes 431A having a prescribed diameter are formed in the undercoat layer 43A by making air present in the holes 411A in the support 41A or gas such as air or water vapor contained in the support 41A move from the holes 411A in the support 41A to the outside of the undercoat layer 43A, or else the filler is coated on such that the undercoat layer 43A is not formed at the sites of the holes 411A in the support 41A.

The movement of gas contained in the support 41A to the outside of the undercoat layer 43A can be carried out, for example, by heating the support 41A on which the undercoat layer 43A has been formed. Through this heating, air present in the holes 411A expands, and escapes to the outside while pushing the undercoat layer 43A out of the way. Moreover, in the case that the support 41A is made of a material containing air, moisture or the like, air contained in the support 41A expands, or moisture vaporizes to form water vapor, and this air or water vapor tries to escape to the outside of the support 41A; however, because the gas barrier layer 42A has been formed on one surface of the support 41A, and the undercoat layer 43A has been formed on the other surface, the gas such as air or water vapor collects in the holes 411A which are not blocked by these layers. Together with the air present in the holes 411A, the gas such as air or water vapor that has collected in the holes 411A escapes to the outside while pushing out of the way the undercoat layer 43A on the side where the holes 411A open out, and hence the parts through which the gas passes become the through holes 431A in the undercoat layer 43A.

The diameter and number density of the through holes 431A formed in the undercoat layer 43A in this way are approximately the same as the diameter and number density of the holes 411A in the support 41A.

Note that in the case that the undercoat layer 43A is made of a filler, even in the case that throughholes 431A having a diameter less than the prescribed diameter (0.1 µm) are formed in positions corresponding to the holes 411A in the support 41A when the filler is coated on, by making gas pass through from the holes 411A in the support 41A as described above, the diameter of the through holes 431A in the undercoat layer 43A can be increased to approximately the same size as the diameter of the holes 411A in the support 41A.

Next, as shown in FIG. 7(e), a release agent is coated onto the undercoat layer 43A so as to form the release agent layer 44A. At this time, the release agent layer 44A is formed such that the through holes 441A can be formed therein in positions corresponding to the through holes 431A in the undercoat layer 43A. Specifically, through holes 441A having a prescribed diameter are formed in the release agent layer 44A by making air present in the holes 411A in the support 41A and the through holes 431A in the undercoat layer 43A or gas such as air or water vapor contained in the support 41A move from the through holes 431A in the undercoat layer 43A to the outside of the release agent layer 44A, or else the release agent is coated on such that the release agent layer 44A is not formed at the sites of the through holes 431A in the undercoat layer 43A.

With regard to the former method, as for the method of forming the through holes in the undercoat layer 43A, for example the hole formation can be carried out by heating the support 41A onto which the release agent has been coated. That is, through heating, air present in the holes 411A in the support 41A and the through holes 431A in the undercoat layer 43A expands, or in the case that the support 41A is made of a material containing air, moisture or the like, air contained in the support 41A expands, or moisture vaporizes to form water vapor, and this air or water vapor escapes from the through holes 431A in the undercoat layer 43A to the outside of the release agent layer 44A while pushing the release agent out of the way, and hence the parts through which the gas such as air or water vapor passes become the through holes 441A in the release agent layer 44A The diameter and number density of the through holes 441A formed in the release agent layer 44A are approximately the same as the diameter and number density of the through holes 431A in the undercoat layer 43A.

Note that even in the case that through holes 441A having a diameter less than the prescribed diameter (0.1 μm) are formed in positions corresponding to the through holes 431A in the undercoat layer 43A when the release agent is coated on, by making gas pass through from the through holes 431A in the undercoat layer 43A as described above, the diameter of the through holes 441A in the release agent layer 44A can be increased to approximately the same size as the diameter of the through holes 431A in the undercoat layer 43A.

In the above embodiment, the release agent layer 44A is formed after the through holes 431A have been formed in the undercoat layer 43A. However, the present invention is not limited to this, but rather it is also possible to form the release agent layer 44A after the undercoat layer 43A has been formed without forming the through holes 431A, and then make air present in the holes 411A in the support 41A or gas such as air or water vapor contained in the support 41A move from the holes 411A in the support 41A to the outside of the release agent layer 44A, so as to form through holes 431A and 441A having a prescribed diameter in the undercoat layer 43A and the release agent layer 44A.

Note that the material of the pressure-sensitive adhesive layer 3A and the method of forming the pressure-sensitive adhesive layer 3A, and the material of the base material 2A are as for the pressure-sensitive adhesive layer 3 and the base material 2 in the first embodiment described above.

The above embodiments have been described for facilitating understanding of the present invention, and not for limiting the present invention. The various elements described in the above embodiments are thus deemed to also include all design modifications and equivalents falling under the technical scope of the present invention.

For example, either the gas barrier layer 42 or the undercoat layer 43 of the release liner 4A in the second embodiment described above may be omitted in accordance with the material of the support 41A.

EXAMPLES

Following is a more detailed description of the present invention through examples and so on; however, the scope of the present invention is not limited by these examples and so on.

Example 1

A release liner (made by Mitsubishi Polyester Film Corporation, Diafoil MRF 75, thickness: 75 μm) comprising a polyethylene terephthalate film one surface of which had been subjected to release treatment with a silicone resin was irradiated with a $CO_2$ laser from the release treated surface thereof, thus forming a plurality of bottomed holes reaching into the polyethylene terephthalate film layer. The diameter of the holes formed was approximately 150 μm, the number density was 2500 per 100 $cm^2$, and the hole depth (excluding a risen up part caused by thermal deformation; likewise hereinafter) was approximately 30 μm.

100 parts by weight of an acrylic pressure-sensitive adhesive (made by Nippon Synthetic Chemical Industry Co., Ltd., Coponyl N-2147, solid content 35 wt %) was mixed with 35 parts by weight of ethyl acetate, and then 1 part by weight of an isocyanate type crosslinking agent (made by Nippon Polyurethane Industry Co., Ltd., Coronate L) was mixed in, and the mixture was stirred thoroughly to obtain a pressure-sensitive adhesive coating agent. The viscosity of the pressure-sensitive adhesive coating agent was 1200 mPa·s (B-type viscometer, 6 rpm).

The pressure-sensitive adhesive coating agent obtained was applied using a knife coater such that the thickness after drying the pressure-sensitive adhesive layer would be 30 μm on to the release treated surface of the above release liner so as to form a pressure-sensitive adhesive layer, and the pressure-sensitive adhesive layer was dried by heating for 1 minute at 90° C. As a result, through holes of diameter 5 to 150 μm were formed in the pressure-sensitive adhesive layer at a number density of approximately 1200 per 100 $cm^2$.

Taking a laminated sheet (made by L-Home, AL Suction Sheet) comprising a polyethylene terephthalate layer (thickness: 50 μm) and a polyacrylic foam layer (thickness: 300 μm, voidage: 50%) as a base material, the foam layer surface of this base material and the pressure-sensitive adhesive layer formed on the release treated surface of the release liner were superposed together, thus obtaining a pressure-sensitive adhesive sheet.

Example 2

A release liner (made by Toyobo Co. Ltd., Crisper G7223, thickness: 75 μm, voidage: approximately 20%) comprising a void-containing polyester film one surface of which had been subjected to release treatment with a silicone resin was irradiated with a $CO_2$ laser from the release treated surface thereof, thus forming a plurality of bottomed holes reaching into the void-containing polyester film layer. The diameter of the holes formed was approximately 180 μm, the number density was 2500 per 100 $cm^2$, and the hole depth was approximately 50 μm.

Using the release liner having the bottomed holes formed therein as described above, a pressure-sensitive adhesive layer was formed and a pressure-sensitive adhesive sheet was produced as in Example 1. The through holes formed in the pressure-sensitive adhesive layer had a diameter of 5 to 180 μm, and a number density of approximately 2100 per 100 cm$^2$.

Example 3

Glassine paper (basis weight: 70 g/m$^2$) as a support of a release liner was irradiated with a $CO_2$ laser from one surface thereof, thus forming a plurality of bottomed holes reaching into the glassine paper layer. A silicone resin was then applied onto the surface of the glassine paper having the holes formed therein using a bar coater such that the thickness after drying would be 0.9 μm, and heating was carried out for 30 seconds at 150° C. to form a release agent layer, thus obtaining a release liner (thickness: 73 μm, final moisture content rate of glassine paper: approximately 5 wt %).

In the release liner obtained, there were also holes formed in the release agent layer, the diameter of these holes being approximately 150 μm, the number density being 2500 per 100 cm$^2$, and the hole depth being approximately 25 μm.

Using the release liner having the bottomed holes formed therein as described above, a pressure-sensitive adhesive layer was formed and a pressure-sensitive adhesive sheet was produced as in Example 1. The through holes formed in the pressure-sensitive adhesive layer had a diameter of 5 to 150 μm, and a number density of approximately 1700 per 100 cm$^2$.

Example 4

A polyethylene resin was laminated as an undercoat layer (thickness: 15 μm) onto one surface of woodfree paper (basis weight: 80 g/m$^2$) as a support of a release liner. A silicone resin was applied onto the surface of the undercoat layer using a bar coater such that the thickness after drying would be 0.5 μm, and heating was carried out for 30 seconds at 150° C. to form a release agent layer, thus obtaining a release liner (thickness: 120 μm, final moisture content rate of woodfree paper: approximately 5 wt %).

The release liner obtained was irradiated with a $CO_2$ laser from the release treated surface thereof, thus forming a plurality of bottomed holes passing through the undercoat layer and reaching into the woodfree paper layer. The diameter of the holes formed was approximately 150 μm, the number density was 2500 per 100 cm$^2$, and the hole depth was approximately 40 μm.

Using the release liner having the bottomed holes formed therein as described above, a pressure-sensitive adhesive layer was formed and a pressure-sensitive adhesive sheet was produced as in Example 1. The through holes formed in the pressure-sensitive adhesive layer had a diameter of 5 to 150 μm, and a number density of approximately 1800 per 100 cm$^2$.

Example 5

A polyethylene resin was laminated as a gas barrier layer (thickness: 15 μm) onto one surface of woodfree paper (basis weight: 110 g/m$^2$) as a support of a release liner. A polyethylene resin was then laminated as an undercoat layer (thickness: 20 μm) onto the other surface of the woodfree paper, and then a silicone resin was applied onto the surface of the undercoat layer using a bar coater such that the thickness after drying would be 0.5 μm, and heating was carried out for 30 seconds at 100° C. to form a release agent layer, thus obtaining a release liner (thickness: 175 μm, final moisture content rate of woodfree paper: approximately 6 wt %).

The release liner obtained was subjected to fusing perforation treatment of Nidaiki Corporation (Kikou Series Kikou S) from the release treated surface thereof, thus forming a plurality of bottomed holes passing through the undercoat layer and reaching as far as the surface of the woodfree paper. The diameter of the holes formed was 160 to 200 μm, the number density was 17,860 per 100 cm$^2$, and the hole depth was approximately 20 μm.

Using the release liner having the bottomed holes formed therein as described above, a pressure-sensitive adhesive layer was formed and a pressure-sensitive adhesive sheet was produced as in Example 1. The through holes formed in the pressure-sensitive adhesive layer had a diameter of 5 to 200 μm, and a number density of approximately 15,000 per 100 cm$^2$.

Example 6

The release liner used in Example 5 was irradiated with a $CO_2$ laser from the release treated surface thereof, thus forming a plurality of bottomed holes passing through the polyethylene laminated layer on the release treated surface side (the undercoat layer) and reaching into the woodfree paper layer. The diameter of the holes formed was approximately 100 μm, the number density was 2500 per 100 cm$^2$, and the hole depth was approximately 60 μm.

Using the release liner having the bottomed holes formed therein as described above, a pressure-sensitive adhesive layer was formed and a pressure-sensitive adhesive sheet was produced as in Example 1. The through holes formed in the pressure-sensitive adhesive layer had a diameter of 5 to 100 μm, and a number density of approximately 2200 per 100 cm$^2$.

Example 7

The release liner used in Example 5 was irradiated with a $CO_2$ laser from the release treated surface thereof, thus forming a plurality of bottomed holes passing through the polyethylene laminated layer on the release treated surface side (the undercoat layer) and the woodfree paper and reaching as far as the polyethylene laminated layer on the non-release treated surface side (the gas barrier layer). The diameter of the holes formed was approximately 120 μm, the number density was 2500 per 100 cm$^2$, and the hole depth was approximately 160 μm.

Using the release liner having the bottomed holes formed therein as described above, a pressure-sensitive adhesive layer was formed and a pressure-sensitive adhesive sheet was produced as in Example 1. The through holes formed in the pressure-sensitive adhesive layer had a diameter of 5 to 130 μm, and a number density of approximately 2350 per 100 cm$^2$.

Example 8

A pressure-sensitive adhesive sheet was produced as in Example 6, except that one obtained by forming recesses of width 50 μm and depth 20 μm at a pitch of 200 μm in a square lattice shape in plan view by etching in one surface of a white polyethylene terephthalate film (made by Toray Industries Inc., Lumirror #100E20, thickness: 100 μm) was used as a base material, and the surface of the base material having the recesses formed therein and the pressure-sensitive adhesive layer formed on the release treated surface of the release liner were superposed together.

Comparative Example 1

A pressure-sensitive adhesive layer was formed and a pressure-sensitive adhesive sheet was produced as in Example 5, but without carrying out the hole formation processing on the release liner used in Example 5. No through holes were formed in the pressure-sensitive adhesive layer in this pressure-sensitive adhesive sheet.

Comparative Example 2

A pressure-sensitive adhesive sheet was produced as in Example 6, except that a white polyethylene terephthalate film (made by Toray Industries Inc., Lumirror #100E20, thickness: 100 μm) was used as the base material.

Test Example

For each of the pressure-sensitive adhesive sheets obtained in the Examples and the Comparative Examples, an air entrapment removability test was carried out as follows, and moreover the appearance was judged with the naked eye.

Air entrapment removability test: The pressure-sensitive adhesive sheet was cut to 50 mm×50 mm and had the release liner peeled off therefrom, and was then stuck onto a melamine coated plate such that air entrapment occurred in a circle of diameter approximately 15 mm, and then the pressure-sensitive adhesive sheet was pressed on using a squeegee. Pressure-sensitive adhesive sheets for which the air entrapment was eliminated as a result were marked as "o", and ones for which air entrapment remained as "x".

The results of the tests are shown in Table 1.

TABLE 1

|  | Air entrapment removability |
| --- | --- |
| Example 1 | o |
| Example 2 | o |
| Example 3 | o |
| Example 4 | o |
| Example 5 | o |
| Example 6 | o |
| Example 7 | o |
| Example 8 | o |
| Comparative Example 1 | x |
| Comparative Example 2 | x |

As is clear from Table 1, the air entrapment could easily be eliminated for the pressure-sensitive adhesive sheets obtained in the Examples.

INDUSTRIAL APPLICABILITY

The present invention can be favorably used in the case of a pressure-sensitive adhesive sheet for which air entrapment or blistering is prone to occur, and a good appearance and adequate adhesive strength are required.

The invention claimed is:

1. A method of manufacturing a pressure-sensitive adhesive sheet comprising:
    manufacturing a release liner having a plurality of bottomed holes that open out on a release treated surface side thereof formed therein in prescribed positions at a prescribed number density, and
    forming a pressure-sensitive adhesive layer on said release treated surface of said release liner, and
    forming in said pressure-sensitive adhesive layer a plurality of through holes that have a prescribed diameter and that pass through said pressure-sensitive adhesive layer in a thickness direction as a result of gas moving from said holes in said release liner to the outside of said pressure-sensitive adhesive layer; and
    laminating said pressure-sensitive adhesive layer onto one surface of a base material having gas-passing channels that communicate to the outside of the pressure-sensitive adhesive sheet formed in at least said one surface thereof, such that said gas-passing channels in said base material and said through holes in said pressure-sensitive adhesive layer communicate with one another.

2. The method of manufacturing a pressure-sensitive adhesive sheet according to claim 1, wherein a support of said release liner is made of a material containing air and/or moisture.

3. The method of manufacturing a pressure-sensitive adhesive sheet according to claim 2 wherein a gas barrier layer is formed in advance on a non-release treated surface side of said support of said release liner.

4. The method of manufacturing a pressure-sensitive adhesive sheet according to any one of claims 1 through 3, wherein said holes in said release liner have a diameter of 0.1 to 2000 μm and a number density of 30 to 100,000 per 100 $cm^2$.

* * * * *